United States Patent
Lehat

(12) 
(10) Patent No.: US 6,811,257 B1
(45) Date of Patent: Nov. 2, 2004

(54) CONTACT LENS INCLUDING ELEMENTS FOR FILTERING ULTRAVIOLET LIGHT, BLUE LIGHT, AND POLARIZED LIGHT

(76) Inventor: Douglas Lehat, 7 Urban Dr., Selden, NY (US) 11784

( * ) Notice: Subject to any disclaimer, the term of this patent is extended or adjusted under 35 U.S.C. 154(b) by 64 days.

(21) Appl. No.: 10/413,714

(22) Filed: Apr. 15, 2003

(51) Int. Cl.$^7$ ................................. G02C 7/10
(52) U.S. Cl. ........................ 351/163; 351/165
(58) Field of Search .................... 351/160 R, 160.4, 351/161–162, 163, 165, 44–45, 49

(56) References Cited

U.S. PATENT DOCUMENTS

| | | | | |
|---|---|---|---|---|
| 4,669,834 A | * | 6/1987 | Richter | 351/162 |
| 4,681,412 A | * | 7/1987 | Lemelson | 351/162 |
| 5,235,358 A | * | 8/1993 | Mutzhas et al. | 351/163 |
| 5,528,322 A | * | 6/1996 | Jinkerson | 351/163 |
| 5,617,154 A | * | 4/1997 | Hoffman | 351/162 |
| 6,579,918 B1 | * | 6/2003 | Auten et al. | 523/106 |
| 6,678,100 B1 | * | 1/2004 | Marason et al. | 359/888 |
| 2002/0091174 A1 | * | 7/2002 | Soane et al. | 523/106 |

* cited by examiner

*Primary Examiner*—Jordan M. Schwartz

(57) ABSTRACT

The present invention comprises a design for contact lenses that enhances the comfort and well being of the wearer. One embodiment comprises a layer of material that filters polarized light. A second embodiment comprises a layer of material that filters light in the blue part of the light spectrum. The present invention also discloses a contact lens, which includes a central portion of light sensitive material that filters sunlight in proportion to the amount of light penetrating the lens, and is covered with a layer of light filtering material. This light filtering material may either be designed to filter polarized light or light in the blue spectrum.

4 Claims, 2 Drawing Sheets

CONTACT LENS INCLUDING ELEMENTS FOR FILTERING ULTRAVIOLET LIGHT, BLUE LIGHT, AND POLARIZED LIGHT

BACKGROUND OF THE INVENTION

1. Field of the Invention

The present invention relates to corrective eyewear that is designed to be placed directly on the eye and is commonly known as contacts. Furthermore the present invention relates to contact lens eyewear that filters ultraviolet light, blue light and polarized light.

2. Description of the Prior Art

One of the most common forms of corrective eyewear on the market is contact lenses. These lenses are very small discs that are worn directly on the eye and cover at least the pupil. The common cause for poor vision is that the eye is unable to focus all of the incoming light correctly to the retina located at the rear portion of the eyeball. This leads to blurring of vision. Contacts, like other corrective eyewear, refocus light before it enters the pupil so that the retinal image will no longer be blurred. The material that is used to make the contact lenses is of a different index of refraction then the air. This causes the path of light that enters the material to be bent. Contacts are carefully constructed to bend light according to preset specific degrees by varying the curvature of the convex outer surface, the concave inner surface and the thickness between these surfaces. Through an examination process the level of refocusing that is required for a particular wearer is determined and the wearer is then matched with contacts constructed appropriately. There are several materials that have been used for constructing contacts such as glass, and various types of polymers.

The benefits of reducing the level of ultraviolet light entering the pupil are well known. Firstly, unfiltered ultraviolet light can be very harsh and cause discomfort. Secondly, there is evidence that it can lead to permanent damage such as cataracts. For example the number of cases of this condition is larger in the southern portion of the United States where the sunny climate leads to greater exposure to ultraviolet light. Therefore it can be seen that it would be beneficial to provide a filter in contact lenses that would reduce the level of ultraviolet light entering the pupil. This filtering process should only occur when necessary or else the wearer would not be able to see well indoors or at night. There are several materials that are known in the prior art that change their chemical alignment as the level of ultraviolet light increases. These photochromic materials will increase the level of filtering as the level of ultraviolet light increases. Conversely, as the ultraviolet light decreases the chemical alignment will return to its previous form and filter less. It is also known that polymers may be immersed in photochromic materials to saturate them. The resulting polymeric materials act as photosensitive filter to ultraviolet light.

Another filtering feature that is beneficial in eyewear is the reduction of polarized light. Sunlight comprises transverse waves in all directions. When it reflects off of materials such as water, sunlight realigns into predominately horizontal transverse waves. This leads to perceived images of glare and blurriness that is extremely uncomfortable. Therefore several materials have been developed that filter out light at particular orientations to reduce the harshness of this effect. These materials comprise molecules that align themselves in a linear fashion and filter out light accordingly. Since the benefits of filtering polarized light is well known it is clear that it would be beneficial to provide such a filter on contact lenses.

Experiments have indicated that blue light can cause alterations to the photochemistry of the retina that may be detrimental. Furthermore the reduction of blue light can improve vision in atmospheric haze and improve contrast in darker lighting. Another benefit of filtering blue light is a reduction in chromatic irregularity. This leads to improved sharpness. Someone who puts on a pair of blue attenuating lenses can immediately identify these abovementioned benefits. Therefore it would be beneficial to provide a blue light filter on contact lenses.

U.S. Pat. No. 4,377,329 to Stanley Poler discloses a design for a contact lens that comprises a central element that covers the maximum area of the pupil and acts as the vision-correcting element. The remainder of the device is a haptic that is designed for application and wear while minimizing the coverage of the eyeball of the wearer. The present invention suggests a central pupil-covering element, but additionally discloses an element of this type that comprises a photochromic material. The Poler '329 patent Does not disclose a filter for polarized light or blue light.

U.S. Pat. No. 4,681,412 to Jerome H. Lemelson is a design for a contact lens that contains light sensitive material. Several versions of lenses with this property are suggested. The version that is closest to the present invention is pictured in FIG. 1. This design comprises a photosensitive material that encompasses the central portion of the contact and is molded to a non-photosensitive material at the outer rim. While the Lemelson '412 patent discloses a structure for filtering ultraviolet light that is similar to the present invention, there is no disclosure in this patent for a filter for polarized light or blue light.

U.S. Pat. No. 4,889,413 to Mary E. Ormsby et al discloses a manufacturing process for producing polyurethane plastics that have photochromic properties. While this patent discloses photochromic materials, it does not disclose the use of such a material for contact lenses. Furthermore it does not suggest the use of a polarizing filter or a blue light filter in coordination with such a material.

U.S. Pat. No. 5,181,053 to Howard J. Brown describes a tool for forming a contact lens into multi-focal lenses. While this patent does describe a method for producing a separate element at the diameter of a pupil, it does not disclose the incorporation of photochromic or photosensitive material. The Brown '053 patent docs not disclose a filter for polarized light or blue light U.S. Pat. No. 6,113,813 to Kamal Goudjil discloses a photochromic ultraviolet protective shield. While this disclosure does disclose a device that incorporates a photochromic material, it does not disclose the use of such a material in contact lenses. Additionally, the Goudjil '813 patent does not disclose a filter for polarized light or blue light.

U.S. Pat. No. 6,248,264 to Clark et al is a patent for compositions that comprise a compound that has photochromic properties. While this is an example of the many materials that provide photochromic properties, the materials themselves are not being claimed here. The disclosure of the present invention is the use of such a composition in a contact lens in coordination with a filter for polarized light or blue light.

Therefore a need exists for a novel and enhanced contact lens that provides a filtering element for polarized light. Photochromic material may also be incorporated into the contact lens to filter ultraviolet light.

SUMMARY OF THE INVENTION

In view of the foregoing disadvantages inherent in the known types of contacts present in the prior art, the present invention provides an improved combination of comfort and well being, and overcomes the abovementioned disadvantages and drawbacks of the prior art. As such, the general purpose of the present invention, which will be described subsequently in greater detail, is to provide a new contact lens which has all of the advantages of the prior art mentioned heretofore and many novel features that result in a contact lens which is not anticipated, rendered obvious, suggested, or even implied by the prior art, either alone or in combination thereof.

In furtherance of this objective, the contact lens including elements for filtering ultraviolet light, blue light, and polarized light comprises a contact lens that comprises material that filters polarized light.

There has been outlined, rather broadly, the more important features of the invention in order that the detailed description thereof that follows may be better understood and in order that the present contribution to the art may be better appreciated.

The present invention may in the alternative comprise material that filters light in the blue spectrum.

The present invention may in addition comprise a photosensitive material that filters ultraviolet light at a rate that is directly proportional to the amount of sunlight entering the material.

The present invention may comprise a portion that is formed to the contour of the pupil of an eye and aligns with the pupil. The portion further comprises a photosensitive material that filters ultraviolet light at a rate that is directly proportional to the amount of sunlight entering the material.

The present invention may provide a layer of material that overlaps a contact of standard form and comprises a chemical compound that aligns itself linearly to filter light of a particular transversal orientation.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved contact lens including elements for filtering ultraviolet light, blue light, and polarized light that has all of the advantages of the prior art and none of the disadvantages.

It is another object of the present invention to provide a new and improved contact lens including elements for filtering ultraviolet light, blue light, and polarized light that may be easily and efficiently manufactured and marketed.

An even further object of the present invention is to provide a new and improved contact lens including elements for filtering ultraviolet light, blue light, and polarized light that has a low cost of manufacture with regard to both materials and labor, and which accordingly is then susceptible of low prices of sale to the consuming public, thereby making contact lens including elements for filtering ultraviolet light, blue light, and polarized light economically available to the buying public.

Still another object of the present invention is to provide a new contact lens including elements for filtering ultraviolet light, blue light, and polarized light that provides in the apparatuses and methods of the prior art some of the advantages thereof, while simultaneously overcoming some of the disadvantages normally associated therewith.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
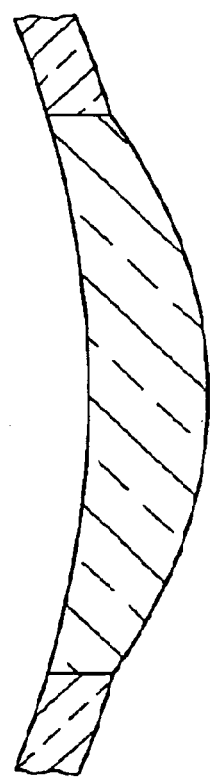
FIG. 1 is a side view of the closest prior art to the present invention.
Figure 3:
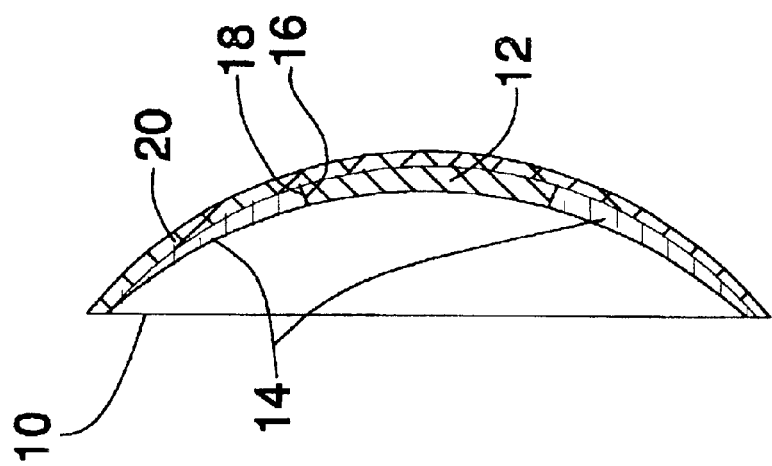
FIG. 3 is a side sectional view of a contact lens including elements for filtering ultraviolet light and polarized light. The same reference numerals refer to the same parts throughout the various figures.
Figure 2:
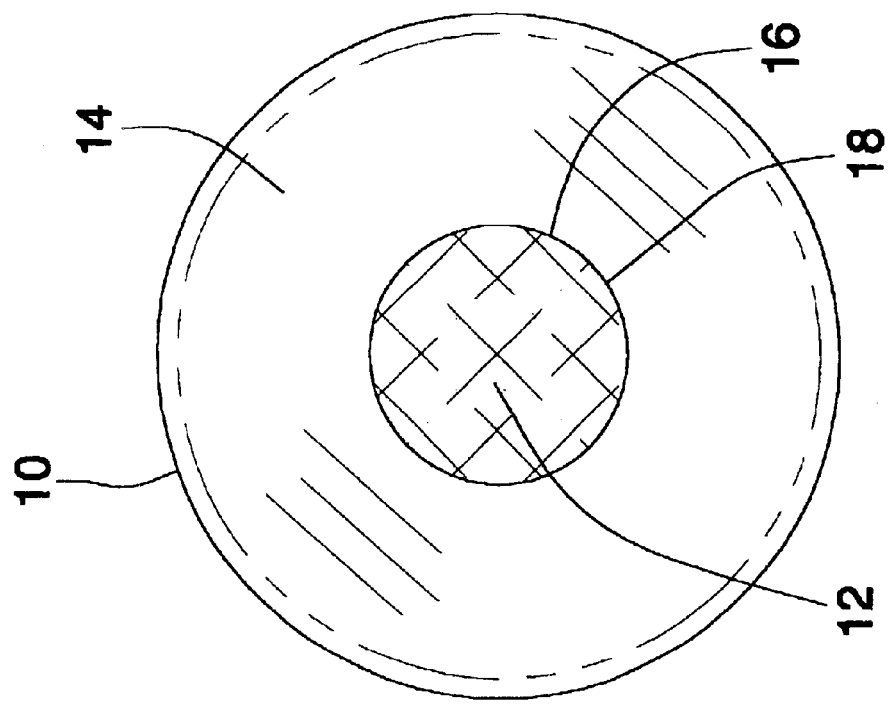
FIG. 2 is a front view of a contact lens including elements for filtering ultraviolet light and polarized light.

Referring now to the drawings, and particularly to FIGS. 1–3, a preferred embodiment of the contact lens including elements for filtering ultraviolet light and polarized light of the present invention is shown and generally designated by the reference numeral 10.

In FIG. 2 is shown a contact lens 10 that comprises a central portion 12 that comprises a photosensitive material. An annular portion 14 comprising material that is clear surrounds this central portion 12. Layered over said central portion 12 and said annular portion 14 is a film comprising a chemical makeup which consists of compounds which are aligned in a linear fashion and filter light with a corresponding wave orientation.

There are several materials that are photosensitive and filter ultraviolet light at a level that is directly related to the amount of sunlight they are exposed to. Said materials are known in the art as photochromic. Said photochromic materials consist of compounds, which change in orientation as they are exposed to greater sunlight, thus becoming stronger filters for ultraviolet light. Conversely said compounds return to their original orientation and filter less light. The benefit of these materials is that they may be used in eyewear to provide a filter for light in sunlight, but may still be worn indoors and allow the wearer to see clearly. The common materials used for the construction of contacts are polymers. Said polymers may be saturated with photochromic materials so that they take on photosensitive characteristics. The structure that is disclosed in FIG. 2 is a central disc 12 that is made of such a polymer, which is saturated to take on a photochromic filtering capacity. Said central disc 12 comprises a diameter equal to the maximum diameter of a pupil. When worn said central disc 12 would cover the wearer's pupil. The light that would enter said pupil would therefore first pass through a photochromic material that will filter uncomfortable and harmful ultraviolet light. The diameter of said central disc 12 is limited to that of the pupil so that it will not cause unnecessary discolorization to the remaining portion of the eye. The pupil is black and therefore its appearance will not be substantially changed by the tint of the photochromic material. The remaining annular ring 14 may be made of a normal unsaturated polymer. The outer edge of said central disc 16 and the inner edge of said annular portion 18 might be molded together to form a solitary contact lens unit. Other structures may be used to provide contacts with a central photochromic material and a clear outer ring. For example the base of a contact may comprises entirely clear material and said photochromic material may be layered over said clear material. Furthermore glass has been use for contacts. Contacts may be made of two layers of glass with photochromic material layered between said glass.

The illustration in FIG. 3 is a demonstration of the manner in which a filter for polarized light may be incorporated into the structure of a contact lens. Reflected light is often realigned to comprise light waves that lie in the same plane. This causes glare, discolorization and discomfort. Ultraviolet light filters will not solve the problem of polarized light. Polarized filters absorb the reflected light selectively while transmitting useful light. The present invention comprises a layer of material 20 that may be molded to the top surface of said contact. Said material 20 may comprise chemical compounds which align linearly to act as a filter of polarized light. Said material may comprise a polymer that is saturated with such a chemical compound in a similar fashion as said material comprising photochromic material. Said contact lens 10 may comprise a central disc 12 that comprises a photochromic material. Said central disc 12 is molded to an annular portion 14 that comprises a typical clear contact lens material such as a polymer.

An alternate design of the present invention would replace said layer of material 20 comprising a filter for polarized light with material comprising a filter for blue light. The present invention may comprise a layer of material 20 that may be molded to the top surface of said contact. Said material may comprise chemical compounds that act as a filter of polarized light. Said material may comprise a polymer that is saturated with such a chemical compound in a similar fashion as said material comprising photochromic material.

While a preferred embodiment of the contact lens including elements for filtering ultraviolet light and polarized light 10 has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A lens for use against the eye of a person comprising:
   a contact lens base defining a unitary molding of substantially circular configuration comprising a rear surface which is configured and adapted to be disposed in conformance with the central portion of the front of the eye of a person wearing said contact lens and wherein said contact lens base is shaped to correct the vision of the person wearing said lens;
   a sheet overlapping said contact lens base wherein said sheet comprises light absorbing material whereby a portion of light in the blue spectrum passing through said lens to the eye will be reduced;
   wherein said contact lens base comprises a circular central portion located so as to pass the light it receives through the pupil of the eye to the lens of the eye when said contact lens is operatively disposed against the eye of said person and wherein said central portion of said contact lens base comprises a light sensitive material wherein only said light sensitive material changes its light transmissivity when subjected to ambient light such as sunlight.

2. The lens for use against the eye of a person of claim 1 wherein said light sensitive material is a photochromic chemical.

3. The lens for use against the eye of a person of claim 2 wherein said light sensitive material comprises crystals of photochromic chemical supported within and dispersed throughout the polymer forming said circular central portion.

4. A lens for use against the eye of a person comprising:
   a contact lens base defining a unitary molding of substantially circular configuration comprising a rear surface which is configured and adapted to be disposed in conformance with the central portion of the front of the eye of a person wearing said contact lens and wherein said contact lens base is shaped to correct the vision of the person wearing said lens and wherein said contact lens base comprises a central portion located so as to pass the light it receives through the pupil of the eye to the lens of the eye when said contact lens is operatively disposed against the eye of said person and wherein only central portion of said contact lens base comprises a light sensitive material wherein said light sensitive material changes its light transmissivity when subjected to ambient light such as sunlight;
   a sheet overlapping said contact lens base wherein said sheet comprises light absorbing material;
   wherein said light absorbing material of said sheet reduces the amount of light in the blue spectrum passing through said lens to the eye.

* * * * *